J. H. POLLARD.
FASTENING DEVICE.
APPLICATION FILED NOV. 12, 1919.

1,366,212.

Patented Jan. 18, 1921.

WITNESSES

INVENTOR
JOHN H. POLLARD.
BY
ATTORNEYS

UNITED STATES PATENT OFFICE.

JOHN H. POLLARD, OF NEW YORK, N. Y.

FASTENING DEVICE.

1,366,212.　　　　　Specification of Letters Patent.　　Patented Jan. 18, 1921.

Application filed November 12, 1919. Serial No. 337,413.

*To all whom it may concern:*

Be it known that I, JOHN H. POLLARD, a subject of the King of England, and a resident of Bronx, in the county of Bronx, borough of Bronx, State of New York, have invented a new and useful Fastening Device, of which the following is a full, clear, and exact description.

This invention relates to a fastening device and finds expression in a convenient means for fastening the ends of ropes, cords, cables, chains and the like, such for instance where it is desirable to fasten the end or ends of a rope or the like, in a manner wherein it may be readily detached without the inconvenience of untying the knot.

One feature of the invention resides in the application of the salient features of the idea to various instances where it will be advantageously used. A further feature consists in the simplicity of the device and the modest cost of manufacturing the same.

In the accompanying drawing, is illustrated several embodiments of the preferred forms in which the invention may be made, and in said drawing, Figure 1 is a plan view of the device showing the preferred manner of fastening the end of a rope with the device.

Figure 1:
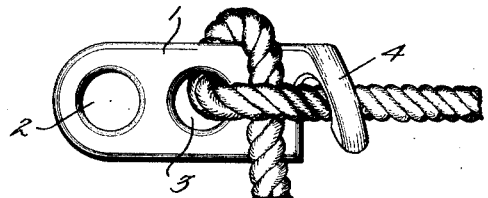
Figure 2:
Fig. 2 is a longitudinal sectional view.
Figure 3:
Fig. 3 is a front view of the device.
Figure 4:
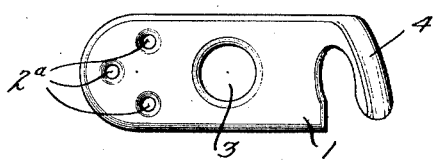
Fig. 4 is a plan view of the device showing one form of securing the same to a supporting structure by mounting the same to the structure.
Figure 5:
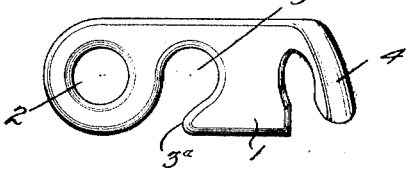
Fig. 5 is a plan view of the device showing a modified embodiment of the rope receiving opening.

Referring to the drawings in detail as illustrated in Fig. 1, the device represents a relatively flat oblong body 1, having an opening 2 near one end thereof whereby the device may be suspended from a hook or any other convenient means. Located intermediate the ends of the device is the rope receiving opening 3 through which one end of the rope is passed and brought over the face of the device transversely thereof with the opposite end of the rope overlying the transverse end and passed under a hook 4 which forms an integral part of the body of the device which is turned at an angle thereto with the part which overlies the rope in a plane above the top surface of the device, so that the thickness of the rope may be accommodated in the hook; the arrangement being such that the hook will produce a biting effect when the rope is maintained tied so that the free end of the rope or transverse end, will be maintained tightly beneath the opposite end which is passed under the hook. The tighter the end which passes under the hook is pulled the more severe will be the biting effect on the transverse presented end, consequently overcoming any tendency of the parts to slip when an abnormal pull is imposed on the rope. The hook of course maintains the respective ends of the rope in proper biting or gripping relation, and there is no chance of same becoming loosened by accident. To release the rope from the device all that is necessary is to remove the end from under the hook 4 which will automatically release the transversely presented end whereupon it may be drawn through the opening 3. In Fig. 4 instead of using the opening 2 for suspending the device suitable screw openings such as 2$^a$ may be used. In Fig. 5 instead of using the opening such as illustrated at 3, the side of the device may be recessed as at 3$^a$ to leave an unobstructed opening from the side of the device to the opening 3$^b$, thus doing away with the necessity of threading the end of the rope in the opening so that the same may be slipped into the opening 3$^b$ through the slotted communication 3$^a$.

Figure 6:
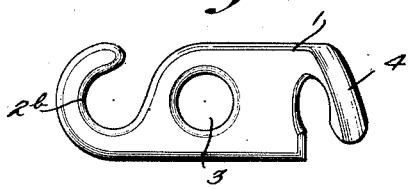
Fig. 6 is another modification of the means for mounting the device to a supporting structure with the rope receiving opening made in accordance with Fig. 1.
Figure 7:
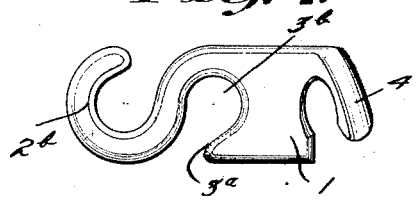
Fig. 7 is a modification showing the rope receiving opening made in accordance with Fig. 5 with the suspending means shown in Fig. 6.

In Fig. 6 instead of employing the opening 2 or screw opening 2$^a$ a hook 2$^b$ may be used for suspending the device. In Fig. 7 as illustrated, the hook 2$^b$ is used in connection with the opening 3$^b$ and a slotted side 3$^a$.

Figure 8:
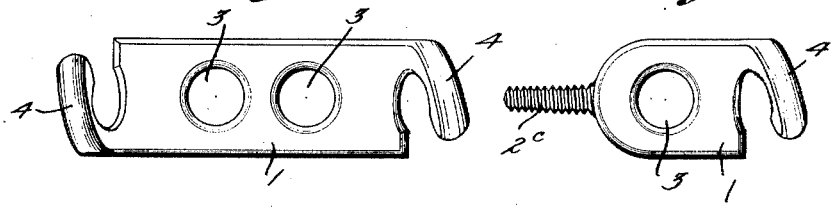
Fig. 8 represents a relatively long double ended device with more than one rope receiving opening.

In Fig. 8 is a double device with hooks 4 on both ends of the device and with a pair of openings such as 3 in the body 1. In this form the body 1 will represent a relatively longer device than in the other forms.

Figure 9:
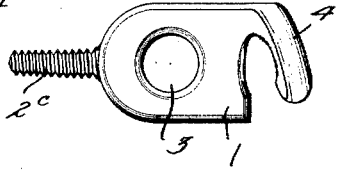
Fig. 9 is still another modification showing a threaded shank whereby the same may be screwed to a supporting structure.

In Fig. 9 instead of using the opening 2 or the screw openings 2ª or the hook 2ᵇ a threaded shank or screw 2ᶜ may be used as a means for mounting the device to a supporting structure.

Throughout the specification and claims where the term "rope" is used it is to be understood as including any similar contrivance. Furthermore where the word "opening" is used in connection with that part of the device represented as 3, and 3ᵇ it is of course to be interpreted as including a slotted opening as shown in Figs. 5 and 7 as well as that form of opening shown in the other figures.

Having thus described my invention what I claim as new and desire to secure by Letters Patent is as follows:—

A fastening device, including a body portion presenting a pair of parallel faces and formed with an opening intermediate its extremities, a hook formed adjacent one of the ends of said body portion and extending beyond and above one of the faces of the same, and terminating at a point below the face mentioned, whereby said hook nearly encircles a rope leading from said opening through said hook, and said hook and plate coöperate to prevent lateral movement of the rope in any direction.

JOHN H. POLLARD.